Dec. 17, 1968   F. ARNAUD   3,416,687
CONTAINER

Filed Sept. 19, 1966   2 Sheets-Sheet 1

INVENTOR
FABIAN ARNAUD

BY

ATTORNEYS.

Dec. 17, 1968  F. ARNAUD  3,416,687
CONTAINER
Filed Sept. 19, 1966  2 Sheets-Sheet 2

INVENTOR
FABIAN ARNAUD

BY

ATTORNEYS.

United States Patent Office 3,416,687
Patented Dec. 17, 1968

3,416,687
CONTAINER
Fabian Arnaud, Condesa 6—703, Mexico City 1, Mexico
Filed Sept. 19, 1966, Ser. No. 580,485
1 Claim. (Cl. 215—39)

ABSTRACT OF THE DISCLOSURE

A mug container for holding liquids and a crown type cap therefor sealingly to close the mouth of the mug and allow transportation and storage of the liquid material within the mug.

---

This invention pertains to combined containers and drinking vessels for beverages, and more specifically to combination articles of the types described which effectively serve the necessary storage and transport function of the vending containers, and are readily converted to drinking vessels upon noncomplex manipulation without the necessity for special opening utensils.

In the sale of beverages for consumption, it has been conventional in the art to employ metallic cans, or glass bottles, some of which have been provided with opening tabs permitting the tops to be wholly or partially removed for drinking therefrom. In the case of cans, objections arise due to real or imagined metallic taste considerations and safety factors from the sharp edges occurring upon removal of or puncturing a portion of the can tops. Bottles as drinking vessels have failed in that purpose due to the reduced diameter of the neck portions thereof or the abrupt edges of the neck portions about the rims thereof. It is a basic objective of the present invention to overcome these objections through the provision of a container combining the advantages of a drinking mug with the inexpensiveness and convenience of a vending container.

A further object of importance of this invention concerns the supplying of a container as aforesaid having convenient handle means as a part thereof.

Still another basic objective of this invention resides in the provision of a sealable drinking-storage vessel for beverages such as malt derived drinks, soft drinks, and the like, having an enlarged, specially shaped neck portion of generally the same diameter as the diameter of the main container portion thereof, and provided with a removable closure element cooperatively associated with the special configuration of the neck portion.

Other and further objects of this invention will become apparent to those skilled in the art from a consideration of the following specification when read in conjunction with the annexed drawings, in which.

Figure 1:
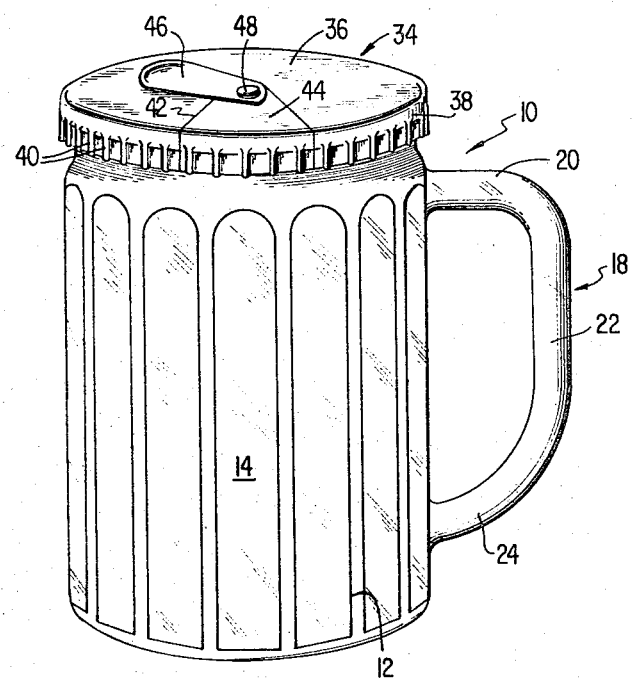
FIGURE 1 is a perspective view showing a drinking-storage container constructed and assembled in accordance with the teachings of this invention.
Figure 2:
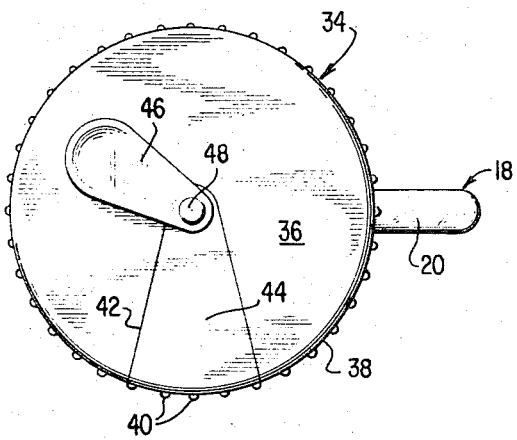
FIGURE 2 is an enlarged top plan view thereof.
Figure 3:
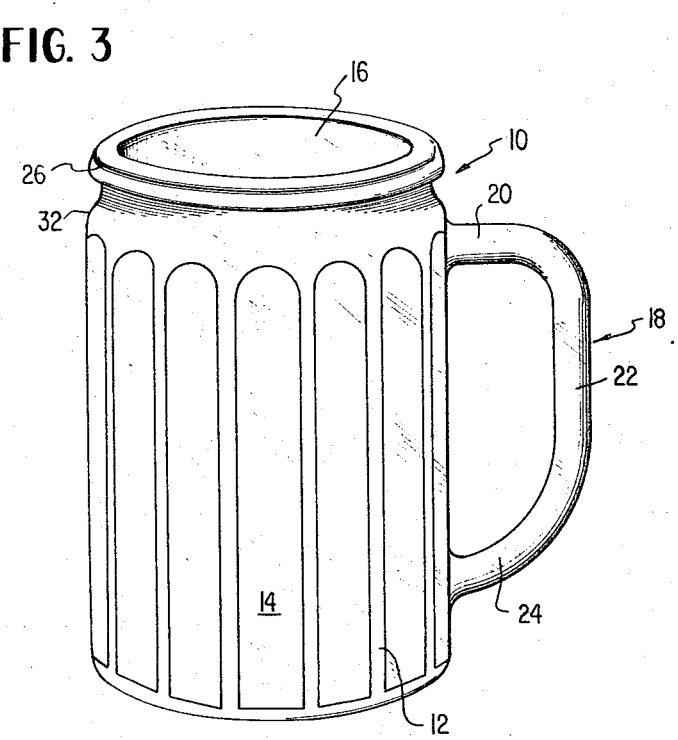
FIGURE 3 is a perspective view similar to that of FIGURE 1, showing the container with its closure element removed.

Referring to the drawing in more detail, FIGURES 1 through 3 illustrate a storage and vending container convertible to use as a drinking vessel in accordance with this invention. The container is generally designated by reference numeral 10 in the drawings, and is formed of glass, or the like, of inexpensive grade. The container 10 is in the general form of a mug type drinking vessel and has a body portion including the usual closed base portion and upstanding tubular side wall 12. The outer surface of the side wall may optionally have flats 14 or other decorative forms thereon and the inner surface 16 is preferably substantially smooth so as to provide an uninterrupted flow of liquid therefrom.

Handle means 18 is supplied, and comprises a first substantially horizontal section 20 projecting outwardly from the surface 14 and merging with an elongated vertical portion 22. A lower section 24 is also connected to the container and completes the substantially U-shaped form of the handle.

Figure 5:
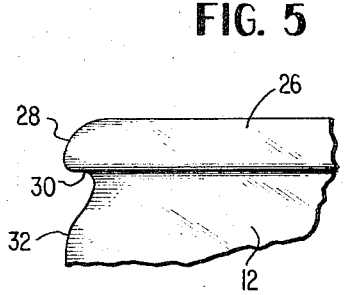
FIGURE 5 is an enlarged, fragmentary side elevational view showing details of the neck configuration hereof.

The side wall 12 is circumferentially indented in the manner best shown in FIGURE 5 to form a container rim 26 about its normally open upper end. The rim includes a rounded outer portion 28, and a comparatively abrupt re-entry portion 30. It is to be observed that the shoulder 32 of the wall adjacent the indentation is also smoothly merged into the general extent of the wall outer surface to avoid a sharp or objectionable protrusion at that area which might interfere with the use of the container as a drinking vessel. As shown in FIGURE 3, absent the closure means hereinbefore set forth, the container 10 effectively provides an attractive and highly usable drinking vessel.

Means for retaining a beverage or the like within the container 10 for sale, storage, and/or transport comprises, in FIGURES 1 and 2, a crown type cap 34 of a size to extend fully over and about the open top and rim 26. The cover 34 is preferably formed of metal—such as aluminum, or the like, and includes a flat top portion 36 overlying the rim, and a skirt 38 crimped about the rim and held in place by compression action forming crimp portions 40 at spaced intervals. For conversion of the crown cap to one of the self opening variety (which is not an absolutely necessary feature of the invention, but is highly desirable) the cover top portion 36 and skirt 38 have a broken or continuously weakened line 42 formed therein defining a tongue 44 with a pull tab 46 secured thereto by a rivet 48. Thus, the cover 34 is readily removed by the expedient of manual pressure applied to the tab 46 to rupture the top of the skirt along said line 42 for removal of the tongue 42.

Figure 4:
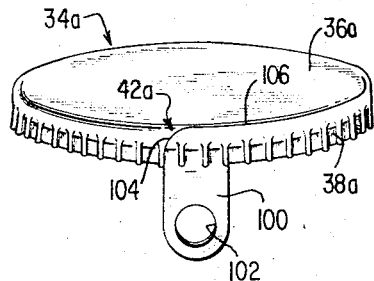
FIGURE 4 is a perspective view showing a modification of the closure means.

FIGURE 4 discloses the cover 34a of a form particularly suited to a wide mouthed container of the instant type wherein the top 36a must extend across a substantial area without support. In this modification, the skirt 38a has a depending cap 100 integrally formed thereon, the cap having a grasping knob 102 struck therein. A tear line 42a is disposed in alignment with one side of the tab at a first portion 104 extending vertically through the skirt, and includes a second portion 106 extending a selected distance about the rim without entry into the general flatwise extent of the top portion thus to avoid weakening of the top thereat.

The containers 10 of this invention are employed in the sale of soft drinks, malt beverages, and the like and it will be observed from the foregoing that, upon removal of the closure 34 or 34a, the material contained therein is in condition for immediate consumption.

Having described and illustrated two embodiments of this invention, in some detail, it will be understood that these descriptions and illustrations have been offered only by way of example, and that the invention is to be limited only by the appended claim.

What is claimed is:
1. A combined drinking vessel and vending container for liquids, the container-vessel comprising:
    a mug type body portion including a base and a side wall, and having an open top;
    handle means on the side wall;

rim means about the side wall adjacent said open top, said rim means having a circumferentially extending groove;

said rim means comprising a smoothly rounded outer portion and a re-entry portion defining said groove, and the side wall having an indentation therein adjacent the rim and being smoothly merged into said indentation, and closure means extended fully across said top and having a depending skirt embracing said rim and extending into said groove, said closure means comprising a crown type cap with a top portion and a skirt depending therefrom;

said skirt being crimped about the rim;

a tongue portion defined by a pair of convergent weakened lines extending into the top portion from the margin of the skirt, and pull tab means connected to the inner end of the tongue.

References Cited

UNITED STATES PATENTS

| | | | |
|---|---|---|---|
| 2,109,699 | 3/1938 | Hutaff | 215—46 |
| 2,652,165 | 9/1953 | Wener | 215—46 |
| 2,689,664 | 9/1954 | Vingron | 215—46 X |
| 3,216,602 | 11/1965 | Koll | 215—46 |
| 3,283,935 | 11/1966 | Samuels | 215—46 X |
| 3,301,433 | 1/1967 | Wade | 220—54 |

FOREIGN PATENTS

| | | |
|---|---|---|
| 432,514 | 10/1911 | France. |
| 21,206 | 6/1930 | Netherlands. |

DONALD F. NORTON, *Primary Examiner.*

U.S. Cl. X.R.

215—46, 100